Jan. 3, 1950     G. J. MARTIN     2,493,588
IMPLEMENT FOR SEVERING CORN KERNELS FROM COBS
Filed April 15, 1947
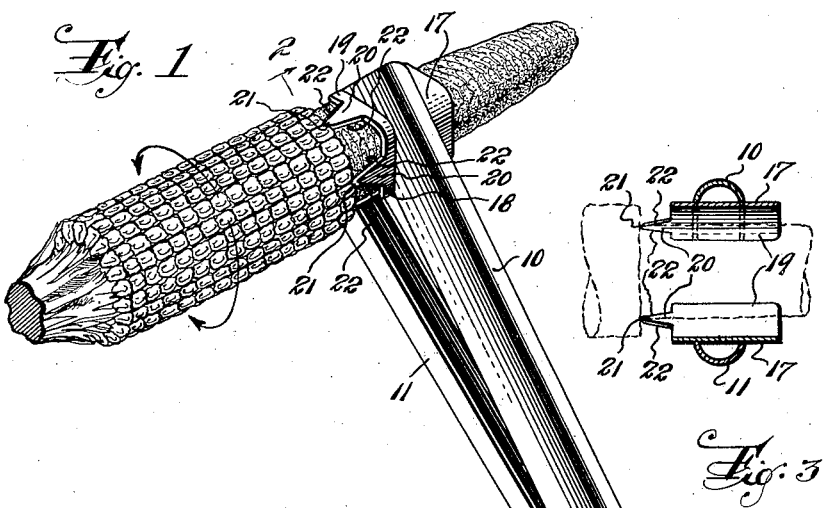
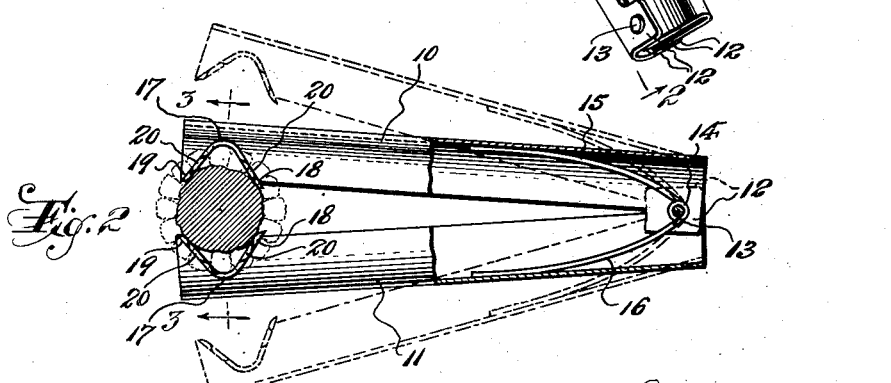
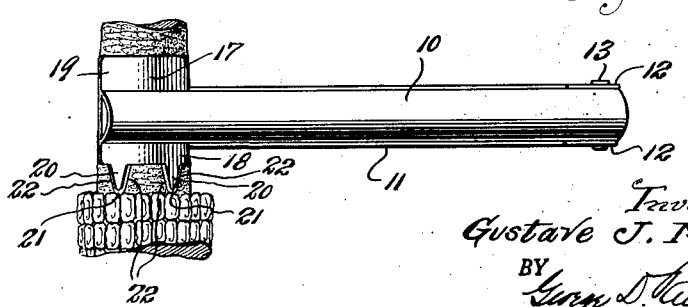
Inventor:
Gustave J. Martin,
BY George D. Richards,
Attorney.

Patented Jan. 3, 1950

2,493,588

UNITED STATES PATENT OFFICE 2,493,588

IMPLEMENT FOR SEVERING CORN KERNELS FROM COBS

Gustave J. Martin, Short Hills, N. J.

Application April 15, 1947, Serial No. 741,578

2 Claims. (Cl. 146—4)

This invention relates to an implement operative to sever kernels from the cobs of corn ears.

The invention has for an object to provide a simple and easily manipulated implement for cutting away the kernels from the cob of an ear of corn; said implement being easily adjustable to various sizes or diameters of corn ears under the controlling grasp of the tool by a user thereof.

The invention has for a further object to provide a novel device or tool for the purposes stated which is of tongs-like structure, the arms of which are provided with opposed jaw members between which a corn ear may be operatively engaged; at least one of said jaw members having cutting means disposed to project from an end thereof in such manner that, when the tool is operatively applied to a corn ear, said cutting means will lie contiguous to the periphery of the corn cob, whereby, when the corn ear is rotated about its longitudinal axis and simultaneously advanced through the jaw members, said cutting means will sever the kernels at their bases close to the surface of the cob without mutilation of said kernels or waste of edible portions thereof.

Other objects of the invention, not at this time more particularly enumerated, will be understood from the following detailed description of the same.

An illustrative embodiment of this invention is shown in the accompanying drawings, in which:

Fig. 1 is a perspective view of the novel tool for severing kernels from the cob of a corn ear as operatively applied to a corn ear.

Fig. 2 is a transverse sectional view, taken on line 2—2 in Fig. 1, the tool being shown in part elevation and in part section.

Fig. 3 is a cross sectional view, taken on line 3—3 in Fig. 2.

Fig. 4 is a top elevational view of the tool as operatively applied to a corn ear, parts of the latter being broken away.

Similar characters of reference are employed in the above described views, to indicate corresponding parts.

Referring to the drawings, the novel tool according to this invention comprises a tongs-like structure formed by opposed arms 10 and 11. Said arms are interconnected at their rearward end portions so as to be capable of movement toward and from one another. For example, said arms may be provided with hinge ears 12 at their rearward ends through which extends a transverse hinge pin 13. Said arms 10 and 11 may be variously made, but illustratively, as shown, comprise sheet metal formations substantially U-shape in cross section, and respectively disposed with their closed or convex sides outwardly presented to form smooth handles for manipulating the tool in a manner to be described hereinafter. Preferably said arms 10 and 11 are yieldably urged to relatively outswung, separated relation by means of a spring member 14 which is mounted on the hinge pin 13, so that the respective legs 15 and 16 thereof bear, with out swinging thrust, against the interior or concave sides of the respective arms 10 and 11. Or the arms may be outswung by inherent spring tension.

Each arm 10 and 11 is fitted at its outer or free end portion with an inwardly facing jaw member 17 of substantial length disposed transverse to the longitudinal axis thereof. Each said jaw member 17 is of transverse concavo-convex form, and preferably of substantially V-shape in cross section so as to comprise oppositely directed side portions 18 and 19 which are angularly divergent from the longitudinally extending central or apex portion thereof. Said jaw members are so relatively disposed that their inner open sides or faces oppose one another. At least one jaw member is provided in extension from an end thereof, preferably as an integral part thereof, with cutting means. Preferably each side portion 18 and 19 of each jaw member is provided with such cutting means. Each such cutting means comprises a substantially triangular cutting blade body 20, the pointed or apex end 21 of which is outwardly directed parallel to the longitudinal axis of the jaw member from which it projects, and the oblique sides of which are provided with sharpened edges 22. Each blade 20 is located intermediate of the apical portion of the jaw member and the longitudinal side edge of the side portion on which it is formed, whereby the said longitudinal side edge of the jaw member projects beyond the cutting edge of the blade and constitutes a guiding means therefor adapted to bear frictionally against the relatively hard cob periphery and maintain the said cutting edge slightly spaced from the cob periphery in overlying relation thereto. Each cutting blade lies in the plane of the side portion of the jaw member on which it is formed and is disposed substantially midway between the free longitudinal side edge of said side portion and the apex portion of the jaw member. The advantages of this construction will appear presently.

In the use and operation of the implement, the arms 10 and 11 are grasped by one hand of the user and an ear of corn, from the cob of which it is desired to cut away the kernels, is grasped by the other hand of the user and an end thereof directed toward the cutting ends of the jaw members 17, so as to enter between said jaw members parallel to the length thereof, whereupon the tool arms are squeezed together to close said jaw members upon the corn ear in such manner as to bring the cutting blades 20 in the plane of the periphery of the cob, whereby to engage the bases of the kernels close to said cob.

While so engaging the tool with the corn ear to be operated upon, said corn ear is thereupon advanced axially between and through the jaw members while imparting to the ear a rotating movement about its longitudinal axis. By such movement of the corn ear relative to the tool jaw members, the annular rows of kernels will be successively advanced against cutting edges 22 of the cutting blades 20, so that the latter will shear transversely through the bodies of the kernels at the bases thereof close to the cob surface, thereby severing the kernels from the cob. In contradistinction to implements that sever the kernels by movement lengthwise of the rows, the present invention may be termed a rotary implement. The severed kernels, as they drop away from the cob, may be caught and collected in a bowl or other receptacle above which the foregoing operations are carried out.

By tightening and relaxing the grip of the hand upon the tool arms 10 and 11, the jaw members 17 may be easily caused to follow and conform to the variations in contour of the cob. Also by reason of such easily accomplished control of the positions of the jaw members, said jaw members are readily and quickly adjusted not only to variations in contour of individual corn ears, but likewise to various sizes and diameters of corn ears. Since the jaw members comprise the angularly divergent side portions 18—19, said side portions will, by movement of the jaw members one toward the other, be caused to dispose themselves tangentially to the circumference of the cob, so that the cutting blades 20 will lie close to and will follow the cob surface during the kernel severing operations. Except when operating upon an ear of corn of very small diameter or when commencing operation upon the reduced tip of a larger ear, the surfaces of each jaw member which have bearing contact with the cob periphery will be the longitudinal free edges of the side portions thereof. This aspect of the jaw members appears clearly in Fig. 2. It is important because of the resulting angular relation of each cutting blade to the cob periphery. Assuming that the ear of corn shown in Fig. 2 is being rotated in clockwise direction, the cutting blade on the lefthand side portion of the uppermost jaw member will be in the lead of the blade on the righthand side portion of the same jaw member and will have its leading cutting edge close to the cob periphery in position to sever the kernels, whereas the leading edge of the trailing blade just mentioned will be elevated above cutting position. The same will be true of the cutting blades on the lowermost jaw; the leading blade will be in cutting position and the trailing blade will be inoperative in that respect. Due to the spiralling progression of the blades along the ear of corn, both leading blades will have the opportunity to engage in cutting operation. In either instance, the surfaces of the jaw members which bear against the cob periphery will serve as guides to maintain the leading edges of the leading cutting blades in slightly spaced relation to the cob periphery at all times, whereby no digging in of the leading edges and consequent severing of inedible material can occur and also whereby the blades will be guided along the changing longitudinal contour of the cob smoothly and without danger of the points of any of the blades digging into the latter. The taper of the cutting edges of the blades will facilitate this smooth movement. Furthermore, due to the guiding function of the bearing surfaces of the jaw members, precise manipulation of the spring-retracted arms of the implement is not necessary. Pressure may be applied to the arms without regard to the degree of the same, except possibly as concerns the braking effect on rotation of the ear and jaw members relative to each other. Simplicity and efficiency of operation have been attained by the structural features just mentioned.

By use of the implement in the manner described, kernels may be rapidly and easily cut away from the cobs of corn ears at points close to the cob surface without mutilation of the kernels or waste of edible portions thereof.

From the above it will be obvious that the present invention provides a novel, very handy and efficient implement for the stated purposes.

Having now described my invention, I claim:

1. A rotary implement of tongs-like structure for slicing the kernels of green corn from the cob comprising a pair of terminally pivoted arms adapted to serve as manipulating means, an elongated channeled concavo-convex jaw member of substantially V-shaped cross-section connection with the free end portion of each arm and disposed with its longitudinal axis transverse to the length of the arm and in perpendicular relation to the plane of both arms, the jaw members of both arms being directly opposed one to the other with their concave faces inwardly presented, each jaw member having flat side portions diverging from its apical portion and provided with straight longitudinal side edges adapted for bearing contact with a cob periphery in substantial parallelism with the axis thereof whereby to form guiding means, and cutting means provided on at least one jaw member, said cutting means being in the form of a thin flat blade disposed in the plane of a side portion of the jaw member and projecting longitudinally therefrom intermediate of the apical portion and a longitudinal side edge, whereby the outer cutting edge of the cutting blade is spaced inwardly from the longitudinal side edge of the said jaw portion and is guided thereby in spaced overlying relation to the cob periphery.

2. A rotary corn slicing implement as defined in claim 1, wherein the cutting blade has outwardly tapering longitudinal cutting edges adapted to exert an oblique slicing stroke against the corn kernels.

GUSTAVE J. MARTIN.

REFERENCES CITED

The following references are of record in the file of this patent:

UNITED STATES PATENTS

| Number | Name | Date |
| --- | --- | --- |
| 53,849 | McGill | Apr. 10, 1866 |
| 359,950 | Wilcox | Mar. 22, 1887 |
| 903,056 | Clift | Nov. 3, 1908 |
| 1,865,619 | Dammrich | July 5, 1932 |
| 2,188,020 | Tewell | Jan. 23, 1940 |

FOREIGN PATENTS

| Number | Country | Date |
| --- | --- | --- |
| 348,900 | Germany | Feb. 20, 1922 |